US010562654B2

(12) United States Patent
Castellari

(10) Patent No.: US 10,562,654 B2
(45) Date of Patent: Feb. 18, 2020

(54) MACHINE FOR PACKAGING SINGLE USE CAPSULES FOR BEVERAGES

(71) Applicant: GIMA S.p.A, Zola Predosa (IT)

(72) Inventor: Pierluigi Castellari, Castel San Pietro Terme (IT)

(73) Assignee: GIMA S.P.A., Predosa (Bologna) (IT)

( * ) Notice: Subject to any disclaimer, the term of this patent is extended or adjusted under 35 U.S.C. 154(b) by 775 days.

(21) Appl. No.: 14/908,160

(22) PCT Filed: Aug. 4, 2014

(86) PCT No.: PCT/EP2014/066684
§ 371 (c)(1),
(2) Date: Jan. 28, 2016

(87) PCT Pub. No.: WO2015/018777
PCT Pub. Date: Feb. 12, 2015

(65) Prior Publication Data
US 2016/0176555 A1    Jun. 23, 2016

(30) Foreign Application Priority Data

Aug. 5, 2013  (IT) .............................. BO2013A0439

(51) Int. Cl.
*B65B 29/02* (2006.01)
*B65B 7/28* (2006.01)
(Continued)

(52) U.S. Cl.
CPC ............ *B65B 29/02* (2013.01); *B65B 7/2807* (2013.01); *B65B 7/2842* (2013.01);
(Continued)

(58) Field of Classification Search
CPC ......... B65B 35/02; B65B 35/18; B65B 35/24; B65B 7/28; B65B 7/2807; B65B 7/2842; B65B 29/02; B65B 29/022
(Continued)

(56) References Cited

U.S. PATENT DOCUMENTS 3,213,901 A * 10/1965 Luthi .................... B65B 63/022
141/12
3,965,656 A * 6/1976 Gerben .................... B65B 3/32
53/282
(Continued)

FOREIGN PATENT DOCUMENTS

CN         101018711 A    8/2007
DE    10 2007 027389 A1   12/2008
(Continued)

OTHER PUBLICATIONS

Application CN201480043868.8 (corresponding Chinese application) Notification of the First Office Action (with Engish translation).
(Continued)

*Primary Examiner* — Chelsea E Stinson
*Assistant Examiner* — Mary C Hibbert-Copeland

(57) ABSTRACT

A machine for packaging single use capsules (1) for extraction or infusion beverages, such as coffee, milk, chocolate, tea, or combinations thereof, includes: a transport element (8) for transporting rigid bodies (2) of the capsules (1) and closed in a loop around movement organs (9) with vertical axis (Z9), to move the transport element (8) continuously, the transport element (8) being configured to define a plurality of seats (10) for the rigid bodies (2), arranged in succession one after the other and having a vertical development axis (Z10); a plurality of stations, arranged along an advancement path (P) followed by the transport element (8), configured to operate continuously and in phase with the
(Continued)

transport element (8) and including: a feeding station (11) for feeding the rigid bodies (2) within the corresponding seats (10) of the transport element (8); a dosing station (12); a closing station (13); an outfeed station (14).

15 Claims, 3 Drawing Sheets

(51) Int. Cl.
  *B65B 35/02* (2006.01)
  *B65B 35/18* (2006.01)
  *B65G 17/22* (2006.01)
  *B65G 17/32* (2006.01)
  *B65G 17/44* (2006.01)
  *B65G 17/48* (2006.01)

(52) U.S. Cl.
  CPC ............ *B65B 29/022* (2017.08); *B65B 35/02* (2013.01); *B65B 35/18* (2013.01); *B65G 17/22* (2013.01); *B65G 17/32* (2013.01); *B65G 17/44* (2013.01); *B65G 17/48* (2013.01)

(58) Field of Classification Search
  USPC ...... 53/167, 282, 304, 248, 296, 307, 131.3; 141/49, 12, 144; 156/499, 567, 571
  See application file for complete search history.

(56) References Cited

U.S. PATENT DOCUMENTS

| | | | |
|---|---|---|---|
| 4,719,739 A | | 1/1988 | Foldesi |
| 5,649,412 A | * | 7/1997 | Binacchi ................ B65B 9/023 |
| | | | 426/77 |
| 5,946,886 A | | 9/1999 | Bealer |
| 2007/0266677 A1 | * | 11/2007 | Nagatani ............... B65B 55/025 |
| | | | 53/467 |

FOREIGN PATENT DOCUMENTS

| | | | |
|---|---|---|---|
| JP | H02286506 A | 11/1990 | |
| JP | 2000326926 A | 11/2000 | |
| WO | 2010/007633 A1 | 1/2010 | |
| WO | 2013/035061 A2 | 3/2013 | |
| WO | WO 2013035061 A2 * | 3/2013 | ............ B65B 43/52 |

OTHER PUBLICATIONS

PCT/EP2014/066684 International Search Report (dated Oct. 8, 2014).
PCT/EP2014/066684 Written Opinion of the International Searching Authority (dated Oct. 8, 2014).
Application JP2016-532344 (corresponding Japanese application) First Office Action (with English translation).

* cited by examiner

MACHINE FOR PACKAGING SINGLE USE CAPSULES FOR BEVERAGES

TECHNICAL FIELD

The present invention relates to a machine for packaging single use capsules for extraction or infusion beverages such as coffee, tea, milk, chocolate or combinations thereof.

Background Art

The above mentioned capsules, used in machines for dispensing these beverages, comprise, in their simplest form:
- a rigid, cup-shaped outer body comprising a perforatable or perforated bottom and an upper aperture provided with a rim (and usually, but not necessarily, having the shape of a truncated cone);
- a dose of product for extraction or infusion beverages contained in the outer body; and
- a lid obtained from a closing sheet for closing (hermetically) the aperture of the rigid body and designed (usually but not necessarily) to be perforated by a nozzle which supplies liquid under pressure.

Usually, but not necessarily, the closing sheet is obtained from a web of flexible material.

In some cases, the capsules may comprise one or more rigid or flexible filtering elements.

For example, a first filter (if present) may be located on the bottom of the rigid body.

A second filter (if present) may be interposed between the lid and the dose of product.

The capsule thus made up can be used in beverage dispensing machines comprising a housing for receiving the capsule.

At present, capsules of this kind are made using machines which operate in "step by step" fashion. One known example of machines of this kind is described in WO2010/007633.

The machine described in WO2010/007633 comprises a link conveyor which is closed in a loop around two power-driven pulleys with horizontal-axis, in such a way as to form an upper, active section and a lower, nonoperative return section.

The conveyor comprises a series of successive seats where the rigid bodies fed by a corresponding station located above the active section of the conveyor are positioned.

As it moves stepwise along an advancement direction, the active section of the conveyor positions each seat containing a respective rigid body under a series of stations for making up the capsule.

In substance, the station which feeds the rigid bodies is followed by at least a dosing station for dosing the product into the rigid bodies, a closing station for closing the aperture of the rigid bodies with a lid (for example by heat-sealing) and, lastly, a drawing station for drawing the capsules made.

It should be noted, however, that along the rectilinear path of the active section, there may be further, auxiliary stations, for example to check capsule weight, form the lid, remove rejects, and so on.

However, a single production line combined with step by step operation has proved to be low in productivity per unit time.

To overcome this problem, the conveyor was made wider in a direction transversal to the advancement direction of the conveyor so as to form a plurality of juxtaposed rows of seats for housing respective rigid bodies.

This technical choice, however, meant augmenting the installed stations, like those mentioned above, placed side by side in a horizontal plane transversal to the direction of motion of the active section of the conveyor.

While this solution on the one hand partly improved the overall productivity of the machine per unit time, on the other hand it made the machine more cumbersome and decidedly more expensive and increased the risks of machine shutdowns owing to the large number of devices operating along the active section of the belt.

This structural choice does not therefore balance the overall costs with the results of operational productivity.

DISCLOSURE OF THE INVENTION

The aim of the present invention is to provide a machine for packaging single use capsules for extraction or infusion beverages such as coffee or tea and which overcomes the above mentioned disadvantages of the prior art.

More specifically, it is an aim of the present invention to provide a machine for packaging single use capsules for extraction or infusion beverages such as coffee or tea and which is capable of guaranteeing high productivity per unit time, with high operating speeds, a reduced number of operating stations, and guaranteeing also a high level of dependability.

A further aim of the present invention is to provide a machine for packaging single use capsules for extraction or infusion beverages, such as coffee or tea, and which has a compact structure, is reduced in size and makes good quality products.

Said aims are fully achieved by the machine for packaging capsules for extraction or infusion beverages according to the invention as characterized in the appended claims.

More specifically, the machine for packaging single use capsules for extraction or infusion beverages, such as coffee or tea, includes: a transport element for transporting the rigid bodies and being closed in a loop around movement organs, with a vertical axis, for continuously moving the transport element; the transport element is configured to define a plurality of seats for corresponding rigid bodies and arranged in succession, each having a respective vertical development axis; a plurality of stations which are positioned along a path followed by the transport element and which are configured for operating continuously in phase with the same transport element and including: a feeding station for feeding the rigid bodies into the respective seats of the transport element; a dosing station for dosing an extraction or infusion product into the rigid body; a closing station for closing the upper aperture of the rigid body with a lid (for example, of flexible material); an outfeed station which draws from the transport element the capsules formed.

A machine so structured is capable of operating continuously with a transport element adapted to carry a single row of seats containing respective rigid bodies along a path where they meet the stations where the steps for making up the capsule are performed.

This architecture thus makes it possible for the machine as a whole to reach high production speeds in reduced spaces.

According to the invention, the transport element for transporting the rigid bodies includes a belt and a plurality of support elements connected to such belt and which define seats with a vertical development axis for the rigid bodies.

This solution allows high flexibility in making up the path to be followed by the transport element, with a relatively wide range of possible geometrical shapes for the transport element to move in the proximity of the various different stations.

It should be noted that the belt moves in a horizontal plane, is reduced in size and is relatively inexpensive.

BRIEF DESCRIPTION OF THE DRAWINGS

These and other features of the invention will become more apparent from the following description of a preferred, illustrative and non-limiting embodiment, with reference to the accompanying drawings, in which.

DETAILED DESCRIPTION OF THE PREFERRED EMBODIMENTS OF THE INVENTION

With reference to the accompanying drawings, the machine according to the present invention (denoted in its entirety by the numeral 100) is used to package single use capsules for extraction or infusion beverages, such as coffee, tea, milk, chocolate or combinations thereof.

Figure 2:
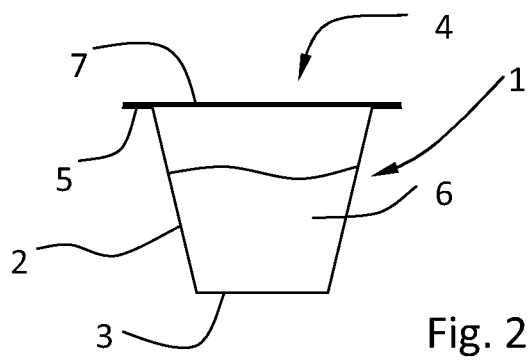
FIG. 2 illustrates a single use capsule, made with the machine of FIG. 1, for extraction or infusion beverages such as coffee, tea, milk, chocolate or combinations thereof, in a schematic side view.
Figure 3:
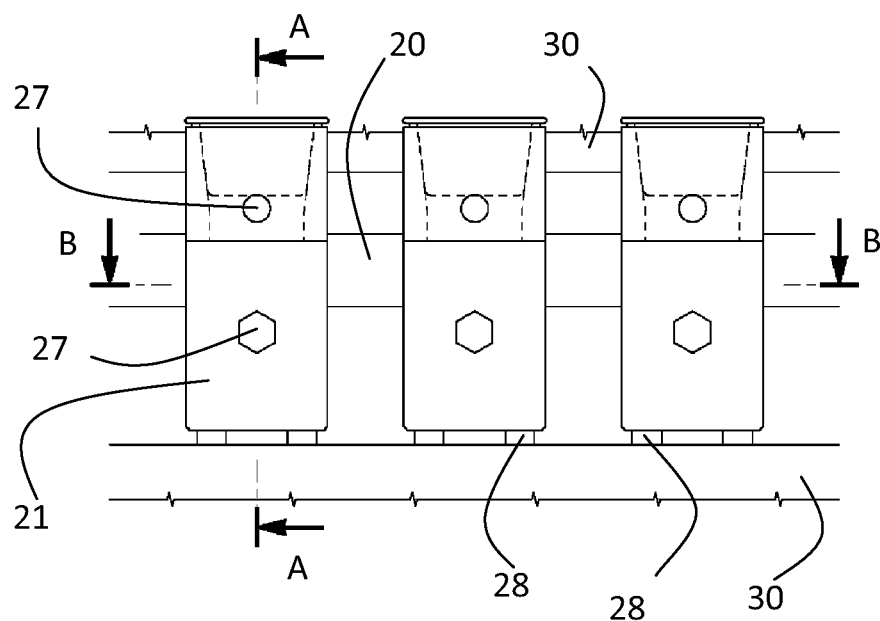
FIG. 3 illustrates a schematic front view of a part of transport element for transporting the rigid bodies of single use capsules.
Figure 4:
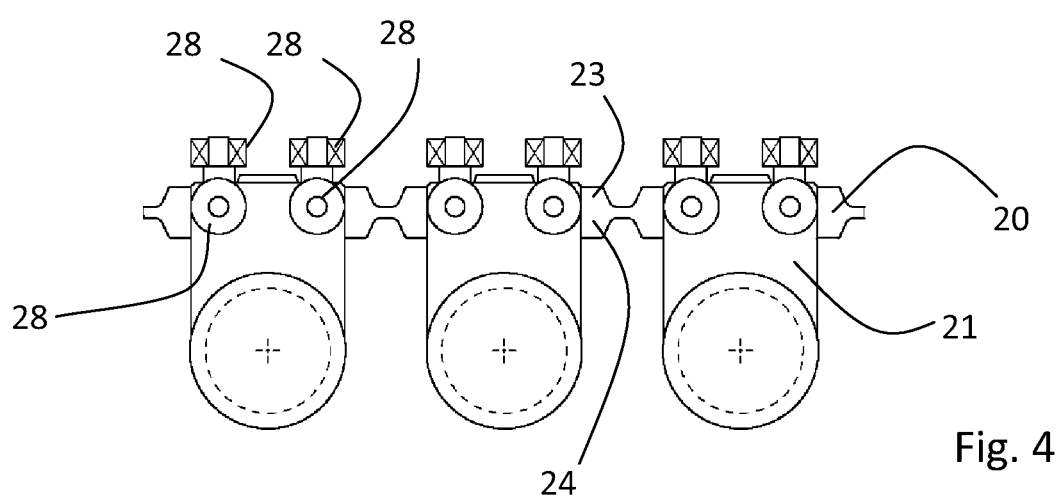
FIG. 4 illustrates a schematic top plan view of the part of transport element of FIG. 3, with same parts omitted for sake of simplicity.
Figure 5:
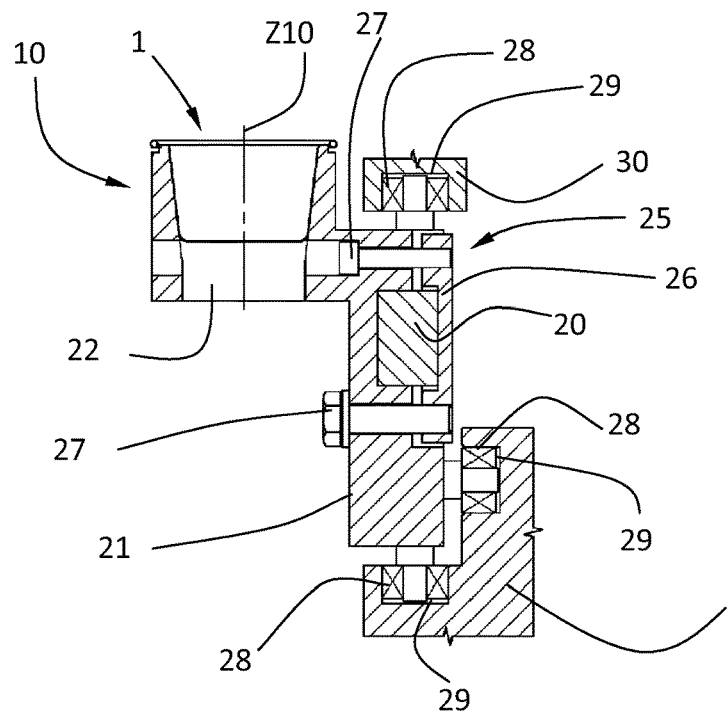
FIG. 5 illustrates a section of the transport element along line A-A of FIG. 3.
Figure 6:
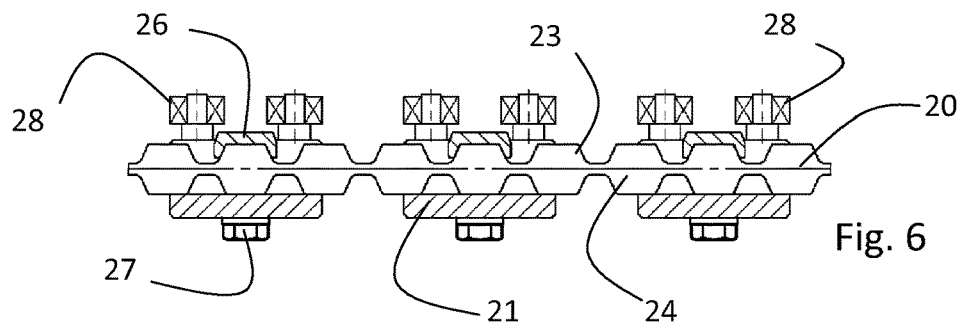
FIG. 6 illustrates a partial section of the transport element according to line B-B of FIG. 3.

More specifically—see FIG. 2—the single use capsules 1 for extraction or infusion beverages include, in a minimum, non-limiting configuration: a cup-shaped, rigid body 2 (usually in the shape of a truncated cone) including a bottom 3 and an upper aperture 4 provided with a rim 5; a dose 6 of product for extraction or infusion beverages contained within the rigid body 2 and a lid 7 for closing the upper aperture 4 of the rigid body 2.

If the lid 7 is to be perforated when the beverage is made, the same lid 7 defines a seal for the rigid body 2. It should be noted that the lid 7 is obtained from a flexible web, that is to say, a web of material having flexibility properties.

It should also be noted that this type of capsule 1 may comprise one or more filtering elements (not illustrated here since they do not form part of the invention).

More specifically, a first filter may be located on the bottom of the rigid body in order to improve the distribution of the infusion product. Such first filter may be a rigid filter. Alternatively, the first filter may be a flexible filter.

The capsule 1 may comprise a second filter positioned between the lid 7 and the dose of product: in this case, the second filter allows improved (uniform) distribution of the liquid on the product.

Figure 1:
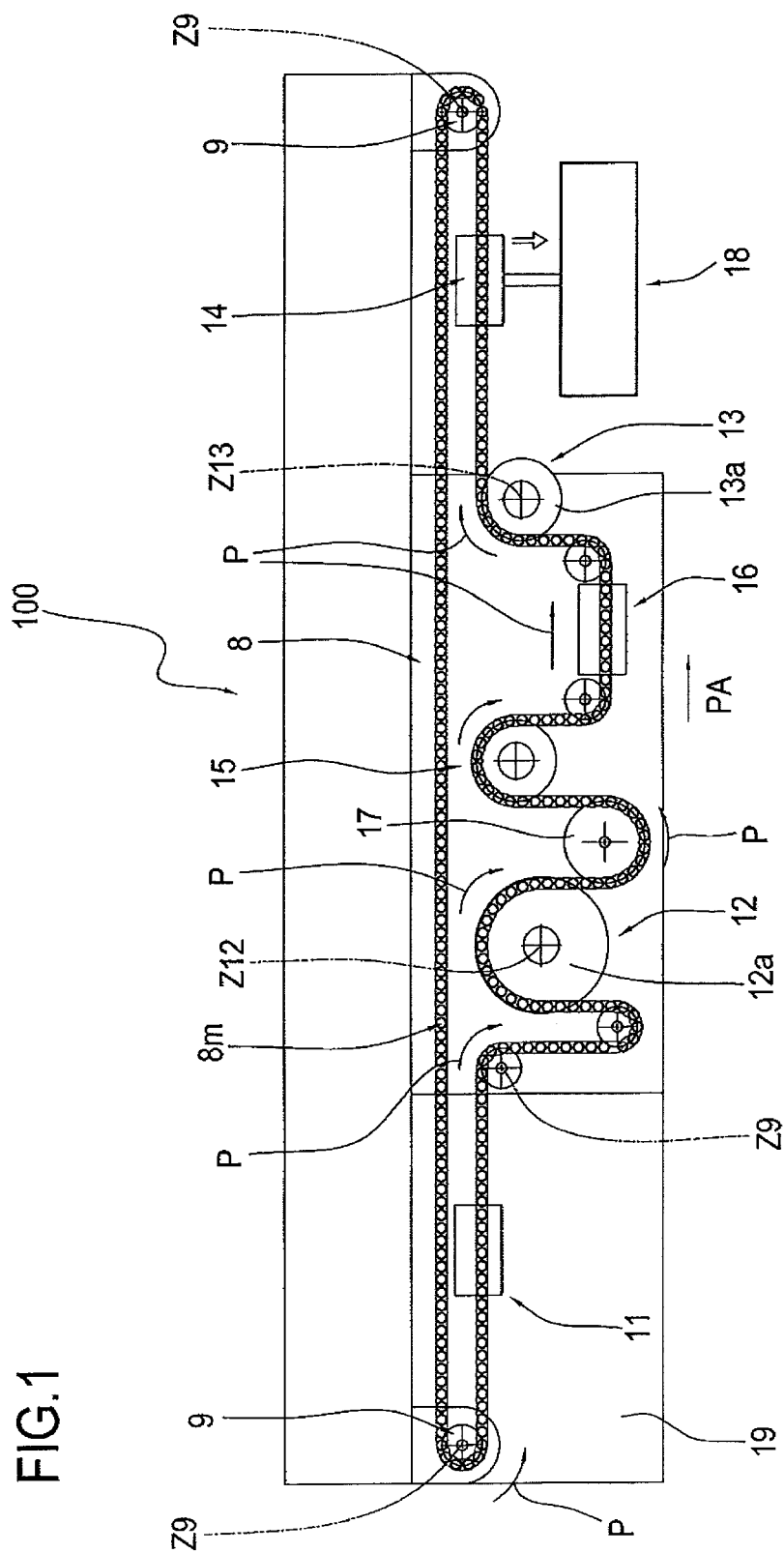
FIG. 1 illustrates a machine for packaging single use capsules for extraction or infusion beverages, such as coffee, tea, milk, chocolate or combinations thereof, according to the present invention, in a schematic top plan view.

According to the invention (see FIG. 1), the machine 100 includes a transport element 8 for transporting the rigid bodies 2 and which is closed in a loop around movement organs 9 which rotate continuously about vertical axes Z9 for continuously moving the transport element 8 (and thus the rigid bodies 2) along an advancement path P. Advantageously, such advancement path P lies on a horizontal plane.

Again according to the invention, the machine 100 includes a plurality of operative stations, which are arranged along the advancement path P followed by the transport element 8 and which are configured for operating continuously in phase with the same transport element 8, and including:

a feeding station 11 for feeding the rigid bodies 2 into respective seats 10 of the transport element 8;

a dosing station 12 for dosing the product for extraction or infusion beverages into the rigid bodies 2;

a closing station 13 for closing the upper aperture 4 of the rigid bodies 2 with a respective lid 7; and an outfeed station 14 for drawing from the transport element 8 the capsules 1 formed.

The transport element 8 includes a belt 20 and a plurality of support elements 21 which define respective seats 10 with corresponding vertical development axis Z10 for the rigid bodies. In particular, the support element 21 features a hole 22 that defines the seat 10 for the rigid body 2. Advantageously, as illustrated, the hole 2 is a through hole; alternatively, the hole 2 can be a dead hole with an upper opening. The support elements 21 are arranged in succession one after the other along the advancement path P.

It should be noted that the belt 20 defines a single row of rigid bodies 2 advancing continuously along the advancement path P.

Figure 7:
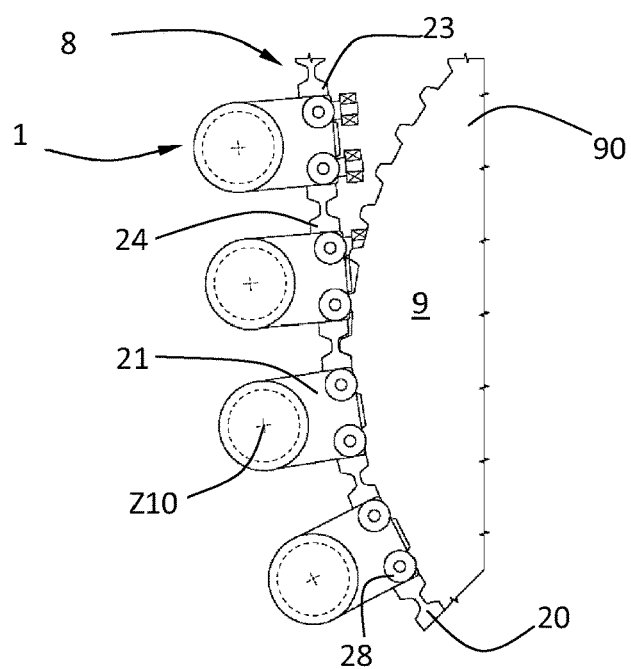
FIG. 7 illustrates a top plan view of an enlarged detail of the machine of FIG. 1, wherein the transport element gears with a movement organ, with some parts omitted for sake of simplicity.

The belt 20 includes a plurality of inner teeth 23 adapted to gear with the movement organs 9, the latters including for example a toothed pulley 90 (see FIG. 7).

Advantageously, as in the illustrated embodiment, the belt 20 includes a plurality of outer teeth 24 adapted to gear with corresponding teeth of at least one toothed wheel present on at least one operative station, for example the dosing station 12.

The toothed wheels which gear with the teeth (23, 24) of the belt 20 present on the operative stations can be advantageously driven toothed wheels, so as to assist the movement organs 9; alternatively, one or more of such toothed wheels can be idle.

It is apparent that, depending on where the operative stations are arranged along the advancement path P, i.e. internally, or externally to the loop achieved by the transport element 8, the toothed wheels present in such operative stations gear with the inner teeth 23 or the outer teeth 24 of the belt 20. In case all of the operative stations are positioned internally to the loop achieved by the transport element 8, a belt 20 with a single row of (inner) teeth can be used.

The belt 20 is made of flexible material, for example rubber, so as to bend on a horizontal plane along the advancement path P in correspondence of curved tracts of the same advancement path P. In substance, the belt 20 is adapted to bend and gear with the movement organs 9, the toothed wheels of the operative stations, or transmission elements present along the advancement path P.

The support elements 21 are connected to the belt 20 by means of suitable fixing means 25. Advantageously, the fixing means 25 include, for each support element 21, at least one clamping plate 26 arranged opposite the support element 21 with respect to the belt 20 and at least one clamping element 27, adapted to fix the support element 21 to the block plate 26, so as to tighten the belt 20 therebetween. Advantageously, the clamping plate 26 is arranged in correspondence of an inner tooth 23 of the belt 20. In the illustrated embodiment, each support element 21 is fixed to the clamping plate 26 by means of two clamping elements 27, for example screws.

The movement organs 9 and the toothed wheels of the operative stations that gear with the belt 20 features respective teeth suitably dimensioned and/or mutually spaced apart to properly gear with the (inner 23 and/or outer 24) teeth of the belt 20 and/or the clamping plates 26 with which are coupled.

In machines 100 with relatively long rectilinear tracts of the advancement path P, the transport elements 8 advantageously includes a plurality of guide elements 28, in particular at least one guide element 28 for each support element 21.

In detail, at least one guide element 28 is connected to the support element 21 and is adapted to slide in a corresponding groove 29 achieved on a reference element 30 of the machine 100 to guide and refer the support element 21 (thus the rigid body 2) with respect to the operative stations along the advancement path P. In substance, the guide elements 28, as they cooperate with the respective grooves 29, allow to define an accurate and repeatable position of the support element 21, preventing the same support element 21 to translate along, and rotate about, vertical directions, to translate along horizontal directions transversal to the advancement path P and to rotate about directions parallel to the advancement path P. In other words, each movement, but an advancement movement along the advancement path P, is prevented to the support element 21 by the cooperation of the guide elements 28 and the corresponding grooves 29.

In the preferred embodiment illustrated in the figures, three pairs of guide elements 28 are connected to the support element 21 and are adapted to slide in respective three grooves 29 achieved on two reference elements 30. In an analogous way, the two reference elements 30 illustrated can be achieved in a single piece.

In FIG. 7, the reference elements 30 have been omitted to better illustrate how the belt 20 gears with the toothed pulley 90 of the movement organs 9.

In not illustrated embodiments, wherein the rectilinear tracts of the advancement path P are relatively short, or the transport element 8 is substantially always geared with the movement organs 9 or the toothed wheels present in the operative stations, the guide elements 28 and the reference elements 30 can be omitted, as the same movement organs 9 and toothed wheels refer the support elements 21.

Preferably, the machine 100 comprises a cleaning station 17 for cleaning the rim 5 of the upper aperture 4 of the rigid body 2 and positioned downstream of the dosing station 12 with respect to an advancement sense (indicated by the arrow PA) of the transport element 8.

Preferably, the cleaning station 17 is interposed between the dosing station 12 and a weighing station 15.

The cleaning station 17, too, is positioned along the advancement path P and is configured to operate continuously and in phase with the transport element 8.

As mentioned above, advantageously the machine 100 includes a weighing station 15 for weighing the rigid body 2 containing the dose 6 of product and which is positioned along the advancement path P of the transport element 8. It should be noted that the weighing station 15 is configured to operate continuously and in phase with the transport element 8.

Preferably, the weighing station 15 is interposed between the dosing station 12 (or, more specifically, the cleaning station 17) and the closing station 13.

Preferably, the machine 100 includes a cutting station 16 for cutting and positioning the lid 7 on the aperture 4 of the rigid body 2.

The cutting station 16, too, is positioned along the advancement path P of the transport element 8, is configured to operate continuously and in phase with the same transport element 8 and is located upstream of the closing station 13 with respect to the advancement sense PA along the advancement path P of the transport element 8.

Preferably, the machine 100 includes a stacking station 18 for stacking the capsules 1 made and which is positioned close to the outfeed station 14.

It should be noted that the stacking station 18 is configured to receive the same capsules 1 according to a direction transversal to the advancement path P followed by the transport element 8 at the outfeed station 14.

The dosing station 12 and the closing station 13 preferably include a corresponding distributor/actuator element 12a, 13a, circular shaped and mobile about a vertical axis Z12, Z13 in phase with the transport element 8: that way, the corresponding operations (releasing the dose of product and closing—for example by heat sealing—with the lid 7) are carried out along at least one stretch (circular arc) where the distributor/actuator elements 12a and 13a and the transport element 8 are movable in phase with each other along the same path.

Preferably, the advancement path P of the transport element 8 is also defined by a plurality of power-driven transmission wheels 9, rotating about vertical axes Z9 and arranged (for example, keyed) on a supporting frame 19 extending in a horizontal plane; these wheels 9 define the above mentioned movement organs.

It should be noted that the power-driven transmission wheels 9 are positioned along the frame 19 to define an operative, non-linear portion of the advancement path P (completed by the passage along or around the above mentioned operating stations), and a non-operative, rectilinear, return portion of the advancement path P.

Thanks to this structure and, more specifically, to the continuously moving looped belt which feeds the rigid bodies, there is achieved a machine which is extremely compact, but with production performance which is higher than that of machines which operate with step-by-step motion.

The path flexibility of the belt makes it possible to arrange the essential and auxiliary stations according to requirements at suitable positions along the advancement path with reduced overall dimensions.

The path flexibility of the belt also offers more opportunities to create alternative path stretches to allow making capsule variants (for example, addition of filtering elements).

The structure of the machine is therefore extremely flexible and allows high productivity levels to be attained, while maintaining good end product quality standards.

The invention claimed is:
1. Machine for packaging single-use capsules for infusion or extraction beverages, like coffee or tea, the capsules including a rigid body, cup-shaped, with a bottom and an upper aperture provided with a rim, a dose of extraction or infusion product contained within the rigid body, and a lid for closing the upper aperture of the rigid body, the machine comprising:
- a transport element for transporting the rigid bodies, the transport element being closed in a loop around movement organs, continuously rotating about vertical axes for continuously moving the transport element along an advancement path;
- said transport element including a belt and a plurality of support elements, each support element defining a respective seat with a corresponding vertical development axis for a rigid body; the seats being arranged in succession;
- a plurality of operative stations, arranged along the advancement path of the transport element, configured to operate continuously and in phase with the same transport element and including:
  - a feeding station for feeding the rigid bodies within corresponding seats of the transport element;
  - a dosing station for dosing the product within the rigid body;
  - a closing station for closing the upper aperture of the rigid body with a lid; and
  - an outfeed station that draws the capsules formed from the respective seats of the transport element;
- wherein at least the dosing station and the closing station include a corresponding distributing/actuating element, with circular shape and mobile about a vertical axis in phase with the transport element so as to carry out corresponding dosing and closing operations as the transport element moves along at least an arc of a circle where said distributing/actuating element and said transport element are continuously operated in phase along a same path following the arc of the circle;
- wherein the plurality of operative stations includes at least one operative station arranged along the advancement path internally to the loop and at least one operative station arranged along the advancement path externally to the loop.

2. Machine according to claim 1, wherein said belt is made of resilient material, such as to be adapted to bend on a horizontal plane along the advancement path at curved tracts of the same advancement path.

3. Machine according to claim 2, wherein said belt includes a plurality of inner teeth adapted to gear with the movement organs.

4. Machine according to claim 3, wherein said belt includes a plurality of outer teeth adapted to gear with corresponding teeth of at least one toothed wheel present in at least one of the operative stations.

5. Machine according to claim 1, wherein the support elements are connected to the belt by means of fixing means.

6. Machine according to claim 5, wherein said fixing means includes, for each support element, at least one clamping plate, arranged opposite to the support element with respect to the belt, and at least one clamping element adapted to lock the support element to the clamping plate, the latters clamping the belt therebetween.

7. Machine according to claim 6, wherein said at least one clamping plate is arranged in correspondence of an inner tooth of the belt.

8. Machine according to claim 1, including at least one reference element that features at least one groove, said transport element including at least one guide element for each support element adapted to slide in said at least one groove to guide and refer the support element with respect to the operative stations along the advancement path.

9. Machine according to claim 1, including a weighing station for weighing the rigid body with a dose of product, arranged along the advancement path of the transport element; said weighing station being configured to operate continuously and in phase with the transport element, and being arranged between the dosing station and the closing station.

10. Machine according to claim 1, including a cutting station for cutting and positioning the lid onto the upper aperture of the rigid body; said cutting station being arranged along the advancement path of the transport element, configured to operate continuously and in phase with the same transport element and arranged upstream of the closing station with respect to an advancement sense of the transport element.

11. Machine according to claim 1, including a cleaning station for cleaning the rim of the upper aperture of the rigid body arranged downstream of the dosing station with respect to an advancement sense of the transport element; said cleaning station being arranged along the advancement path and configured to operate continuously and in phase with the transport element.

12. Machine according to claim 1, including a stacking station for stacking the capsules, the stacking station being arranged in proximity to the outfeed station and configured to receive the same capsules along a direction transversal with respect to the advancement path of the transport element at the outfeed station.

13. Machine according to claim 1, wherein the closing operation comprises heat sealing carried out as the transport element moves along the arc of the circle.

14. Machine according to claim 1, wherein the advancement path of the transport element is further defined by means of a plurality of driven transmission wheels, rotating about vertical axes, said driven transmission wheels being arranged onto a supporting frame extending horizontally and defining said movement organs.

15. Machine according to claim 14, wherein said driven transmission wheels define an operative, non-rectilinear portion of the advancement path, and a non-operative, rectilinear, return portion of the advancement path.

* * * * *

UNITED STATES PATENT AND TRADEMARK OFFICE
CERTIFICATE OF CORRECTION

| | | |
|---|---|---|
| PATENT NO. | : 10,562,654 B2 | Page 1 of 1 |
| APPLICATION NO. | : 14/908160 | |
| DATED | : February 18, 2020 | |
| INVENTOR(S) | : Pierluigi Castellari | |

It is certified that error appears in the above-identified patent and that said Letters Patent is hereby corrected as shown below:

On the Title Page

In the Assignee Item (73), "GIMA S.P.A., Predosa (Bologna) (IT)" should be changed to --I.M.A. Industria Macchine Automatiche S.p.A., Ozzano dell'Emilia (Bologna) (IT)--.

Signed and Sealed this
Seventeenth Day of March, 2020

Andrei Iancu
*Director of the United States Patent and Trademark Office*